UNITED STATES PATENT OFFICE 2,513,571

METHYL-THIOPHANTHRAQUINONES

Henry R. Lee and Viktor Weinmayr, Pitman, N. J., assignors to E. I. du Pont de Nemours & Company, Wilmington, Del., a corporation of Delaware No Drawing. Application January 22, 1947, Serial No. 723,668

3 Claims. (Cl. 260—329)

1

This invention relates to new thiophanthraquinones, and more particularly to the preparation of methyl-substituted thiophanthraquinones of the formula:

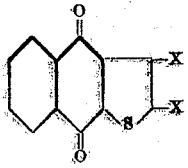

wherein one X stands for a methyl group, while the other X stands for hydrogen.

The term "thiophanthraquinone" is employed in the naming of this compound in view of the original name used by Scholl and Seer, Ann. 394, 131 (1912), who designated the corresponding unsubstituted hydrocarbon compound "thiophanthracene."

This invention has for its object the preparation of new organic compounds particularly suitable for intermediates for the preparation of dyes. A further object of the invention is to provide a commercially feasible process for the preparation of these new methyl-substituted thiophanthraquinones.

These new methyl-substituted thiophanthraquinones, in which the methyl group in each case is in the thiophene ring, may be prepared by ring-closing the corresponding (5-methyl-2-thenoyl)-o-benzoic acid or the (4-methyl-2-thenoyl)-o-benzoic acid with condensing agents commonly employed in the ring-closure of benzoyl-o-benzoic acids. The preferred process for the preparation of the compounds of this invention, however, is the ring-closure of the corresponding methyl-substituted (2-thenoyl)-o-benzoic acids in nitrobenzene by means of aluminum chloride. As illustrated in the following examples, the methyl-substituted (2-thenoyl)-o-benzoic acid can be ring-closed without isolation when it is formed by condensation of the methylthiophene with phthalic anhydride in nitrobenzene by means of aluminum chloride, as more particularly illustrated in our co-pending application Serial No. 723,666. The preferred process for the preparation of the compounds of this invention is the condensation of the methyl-thiophene in phthalic anhydride in nitrobenzene and in the presence of aluminum chloride at temperatures of above 50° C., then adding an additional amount of aluminum chloride and raising the temperature to effect ring-closure to the methyl-thiophanthraquinone.

2

The following examples are given to illustrate the invention. The parts used are by weight.

Example 1

Ten (10) parts of (5-methyl-2-thenoyl)-o-benzoic acid was added to a solution of 12 parts of aluminum chloride in 240 parts of nitrobenzene. The reaction mass was heated to from 130° to 135° C. for about 20 hours, then poured onto dilute hydrochloric acid and steam distilled to remove the solvent. It was boiled with dilute sodium hydroxide to remove unreacted (5-methyl-2-thenoyl)-o-benzoic acid, filtered and washed. The insoluble residue was slurried in a warm solution containing 20 parts of sodium hydroxide and 25 parts of sodium hydrosulfite in 1000 parts of water. The insoluble product was removed by filtration and the methyl-thiophanthraquinone was precipitated by adding m-nitrobenzene sodium sulfonate to the remaining solution. 3.5 parts of 2-methyl-thiophanthraquinone, melting at from 245° to 250° C., were obtained. After crystallizing it from a mixture of about 75 parts of high boiling gasoline and 30 parts of benzene per part of crude product, it was obtained melting at from 249° to 250° C.

Example 2

Thirty (30) parts of anhydrous aluminum chloride and 15 parts of phthalic anhydride were dissolved in 120 parts of nitrobenzene and the solution was heated to from 75° to 80° C. A solution of 10 parts of alpha-methylthiophene in 12 parts of nitrobenzene was added at from 75° to 80° C. over a period of about 30 minutes, and the charge was held at that temperature for 1.5 hours. After cooling to 50° C., 62 parts of nitrobenzene and 28 parts of aluminum chloride were added and the reaction mass was heated to from 105° to 110° C. for about 18 hours. The charge was poured into dilute hydrochloric acid, steam distilled, and the precipitate which had formed was filtered off. After an extraction with alkaline hydrosulfite and oxidation of the solution as described in Example 1, the 2-methyl-thiophanthraquinone was obtained, which, after crystallization from the solvent mixture as in Example 1, had a melting point of from 249° to 250° C.

Example 3

Five (5) parts of (4-methyl-2-thenoyl)-o-benzoic acid were added to a solution of 7.2 parts of anhydrous aluminum chloride in 62 parts of nitrobenzene. The charge was heated to 120° C. for 18 hours, then cooled, poured onto dilute sulfuric acid and steam distilled. The insoluble residue was filtered, washed acid-free, then slurried in a boiling dilute solution of sodium hydroxide in water, filtered hot and washed alkali-free. One (1) part of unreacted (4-methyl-2-thenoyl)-o-benzoic acid was recovered when the alkaline filtrate was acidified. Upon drying of the caustic insoluble material, 3 parts of crude 2-methyl-thiophanthraquinone were obtained. It was purified by extraction with high boiling gasoline in Soxhlet apparatus, followed by recrystallization from high boiling gasoline. Two (2) parts of pure 3-methyl-thiophanthraquinone, melting at from 179° to 180° C., were obtained.

Identical results were obtained when the ring-closure was carried out at from 130° to 150° C. for 20 hours.

*Example 4*

Thirty (30) parts of anhydrous aluminum chloride and 15 parts of phthalic anhydride were dissolved in 120 parts of nitrobenzene and the solution was heated to 80° C. A mixture of 10 parts of beta-methyl-thiophene and 12 parts of nitrobenzene was added at from 80° to 90° C. over a period of 20 minutes. After one hour of heating at from 80° to 90° C., the charge was cooled to 60° C. and 62 parts of nitrobenzene and 28 parts of aluminum chloride were added, and the reaction mass was heated to from 120° to 125° C. for 18 hours. The charge was then poured into water, steam distilled to remove the nitrobenzene, and extracted at about 70° C. with a solution of 20 parts of sodium hydroxide and 20 parts of sodium hydrosulfite in 800 parts of water. Upon oxidation with 20 parts of m-nitrobenzene sodium sulfonate, 3 parts of 3-methyl-thiophanthraquinone were obtained, melting at from 174° to 176° C. For purification the product was distilled and crystallized from about 30 parts of high boiling gasoline per part of distilled product. Pure 3-methyl-thiophanthraquinone, melting at from 179° to 180° C., was obtained.

While in the above examples the ring-closure of the methyl-substituted (2-thenoyl)-o-benzoic acid is carried out in nitrobenzene with aluminum chloride, illustrating a preferred process for producing these new compounds, it will be obvious to those skilled in the art that this ring-closure may be effected by other suitable condensing agents. Where sulfuric acid is employed, it is difficult to avoid sulfonation of the resulting product. Other solvents such as the chlorinated benzenes may be employed in place of nitrobenzene as the reaction medium.

The ring-closure of the methyl-substituted (2-thenoyl)-o-benzoic acids is preferably carried out in the nitrobenzene with aluminum chloride at temperatures of from 90° to 170° C. The reaction time will of course depend upon the temperatures at which the reaction is carried out.

We claim:

1. The methyl-thiophanthraquinones of the formula:

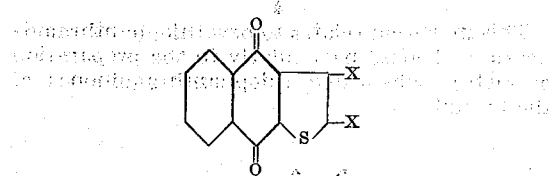

wherein one X stands for a methyl group, while the other X stands for hydrogen.

2. 2-methyl-thiophanthraquinone.
3. 3-methyl-thiophanthraquinone.

HENRY R. LEE.
VIKTOR WEINMAYR.

REFERENCES CITED

The following references are of record in the file of this patent:

Bernthsen and Sudborough, "Organic Chemistry," Van Nostrand, N. Y., 1925 (1922 edition), page 549.

Thomas, "Anhydrous Aluminum Chloride," pages 511, 524, 525, 540, 541. Reinhold Pub. Co., N. Y., 1941.